(12) United States Patent
Yamana

(10) Patent No.: US 9,784,989 B2
(45) Date of Patent: Oct. 10, 2017

(54) IMAGE PICKUP APPARATUS AND CAMERA SYSTEM

(71) Applicant: CANON KABUSHIKI KAISHA, Tokyo (JP)

(72) Inventor: Kazuaki Yamana, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 126 days.

(21) Appl. No.: 14/799,848

(22) Filed: Jul. 15, 2015

(65) Prior Publication Data

US 2016/0018668 A1  Jan. 21, 2016

(30) Foreign Application Priority Data

Jul. 18, 2014 (JP) ................................ 2014-147532

(51) Int. Cl.
G02B 13/16 (2006.01)
H04N 5/225 (2006.01)
G02B 27/64 (2006.01)
G02B 5/08 (2006.01)

(52) U.S. Cl.
CPC ............. G02B 27/646 (2013.01); G02B 5/08 (2013.01); H04N 5/2254 (2013.01)

(58) Field of Classification Search
CPC ....... G02B 27/646; G02B 5/08; H04N 5/2254
USPC ........ 348/335, 340, 345, 348, 350, 352, 354
See application file for complete search history.

(56) References Cited

U.S. PATENT DOCUMENTS

2014/0368941 A1* 12/2014 Sato ..................... G02B 7/1821
359/877

FOREIGN PATENT DOCUMENTS

JP        09-274249 A    10/1997
JP        2010-160211 A   7/2010

* cited by examiner

*Primary Examiner* — Yogesh Aggarwal
(74) *Attorney, Agent, or Firm* — Fitzpatrick, Cella, Harper & Scinto

(57) ABSTRACT

An image pickup apparatus comprises a mirror member rotatable between a first state arranged inside an image pickup optical path and a second state arranged outside the image pickup optical path, an abutting member that abuts against the mirror member in a case where the mirror member is the first state, and a bounce control member attached to the mirror member and configured to control a vibration of the mirror member in a case where the mirror member collides with the abutting member. An attachment part attached to the mirror member is formed at a first end of the bounce control member, a weight part is formed at a second end of the bounce control member, and an elastic deformation part, which is elastically deformable, is formed between the first and second ends of the bounce control member.

18 Claims, 8 Drawing Sheets

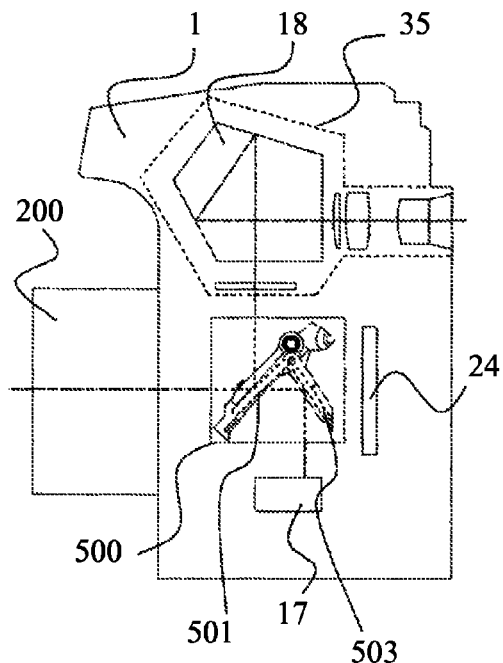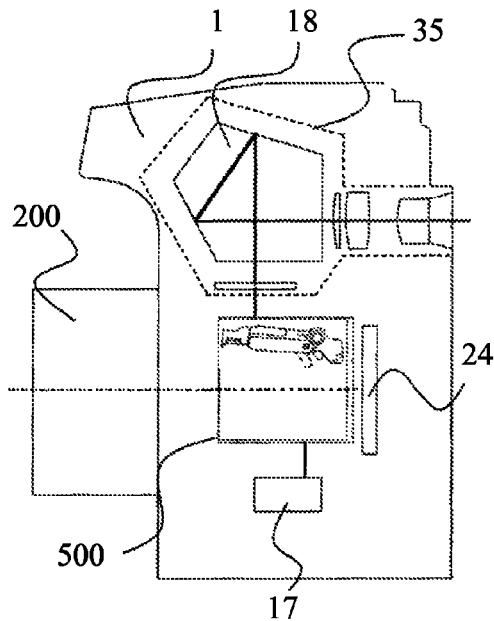
FIG. 2A  FIG. 2B
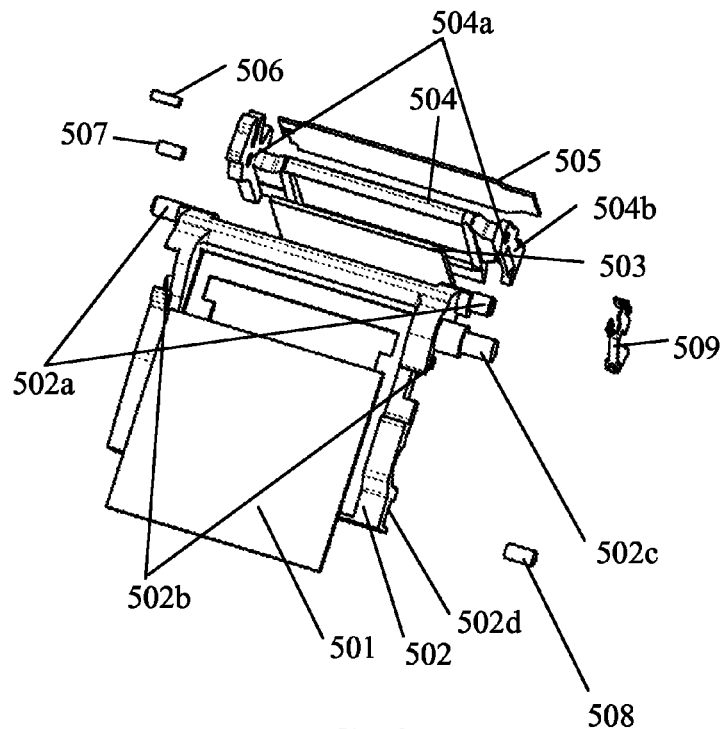
FIG. 3

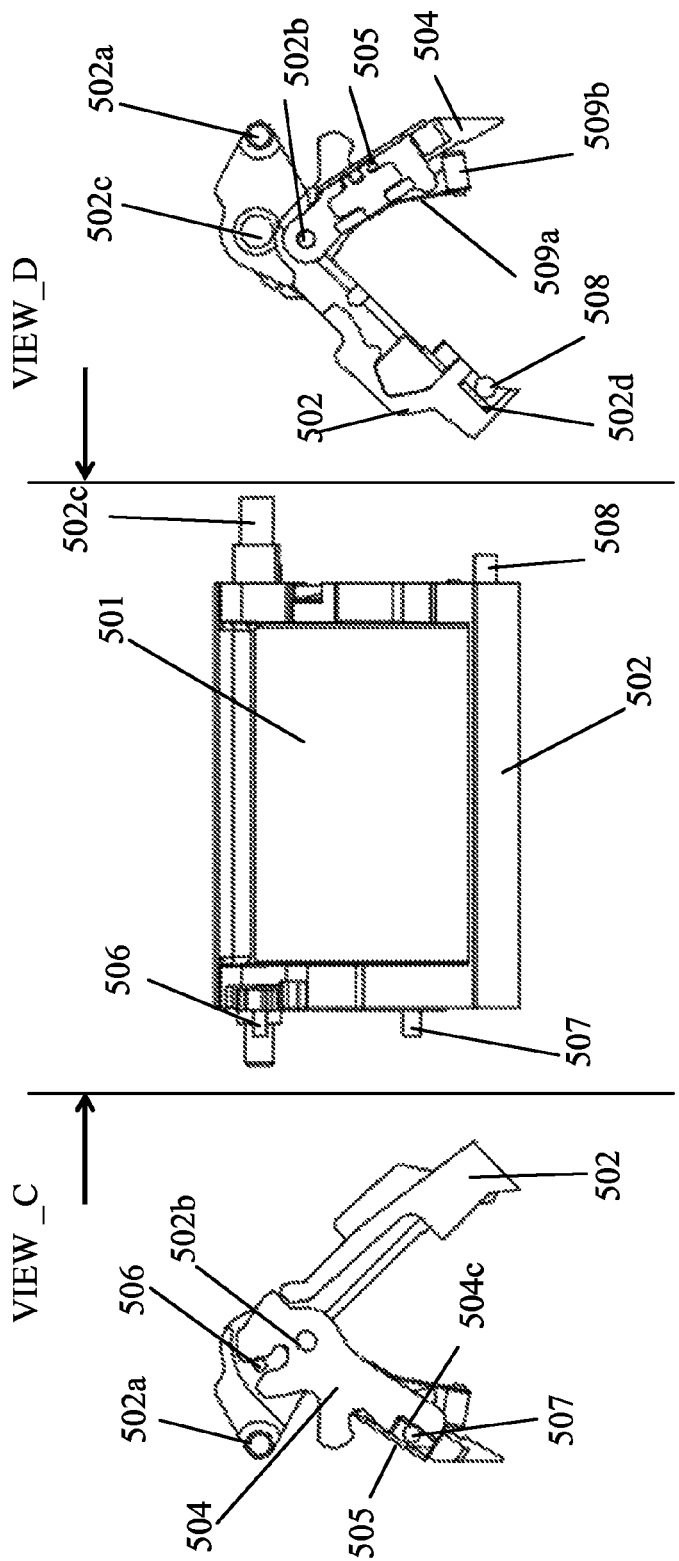

IMAGE PICKUP APPARATUS AND CAMERA SYSTEM

BACKGROUND OF THE INVENTION

Field of the Invention

The disclosure relates to an image pickup apparatus such as a single-lens reflex camera, and more particularly, to an image pickup apparatus including a mechanism that controls a bounce phenomenon of a rotating mirror.

Description of the Related Art

Conventional quick return mirror mechanism, such as a single-lens reflex camera, rotates a main mirror and a sub mirror in and out of an optical path of an image pickup optical system at high speed. Each mirror abuts against a stopper provided on a mirror box to be positioned at a predetermined stop position in an image pickup optical path, and to guide a light to a finder optical system and a focus detecting unit.

Rotating the mirror from outside of the image pickup optical path to inside thereof quickly in the quick return mirror causes collision between the mirror and the stopper. The collision generates a phenomenon in which the mirror bounces (hereinafter referred to as "mirror bounce"). The mirror bounce increases a time to stabilize a finder image and delays focus detection.

Japanese Patent Laid-open No. 09-274249 discloses a configuration as an example of a method to control the mirror bounce that a mirror contacts a movable inertia body so as to decrease a bounce of the mirror. Japanese Patent Laid-open No. 2010-160211 also discloses a configuration that a vibration suppressing member abuts against a mirror during the mirror bounce so as to suppress the bounce.

However, the conventional art disclosed in Japanese Patent Laid-open No. 09-274249 is complicated and thus increases in a size and cost of an apparatus. The conventional art disclosed in Japanese Patent Laid-Open No. 2010-160211 also suppresses an elastic deformation vibration of the mirror using a simple configuration, but bounce suppressing effect is inadequate because energy consumption is failed to be considered.

SUMMARY OF THE INVENTION

In view of foregoing, the invention provides an image pickup apparatus capable of effectively controlling a mirror bounce using a simple configuration.

An image pickup apparatus as one aspect of the invention comprises a mirror member rotatable between a first state arranged inside an image pickup optical path and a second state arranged outside the image pickup optical path, an abutting member that abuts against the mirror member in a case where the mirror member is the first state, and a bounce control member attached to the mirror member and configured to control a vibration of the mirror member in a case where the mirror member collides with the abutting member. An attachment part attached to the mirror member is formed at a first end of the bounce control member, a weight part is formed at a second end of the bounce control member, and an elastic deformation part, which is elastically deformable, is formed between the first and second ends of the bounce control member.

Further features of the present invention will become apparent from the following description of exemplary embodiments with reference to the attached drawings.

BRIEF DESCRIPTION OF THE DRAWINGS

FIGS. 2A and 2B are schematic block diagrams of a camera.

FIG. 3 is a schematic block diagram of a mirror box.

FIGS. 7A to 7C are schematic diagrams illustrating a main mirror and a sub mirror held by a mirror box.

DESCRIPTION OF THE PREFERRED EMBODIMENTS

Figure 1A:
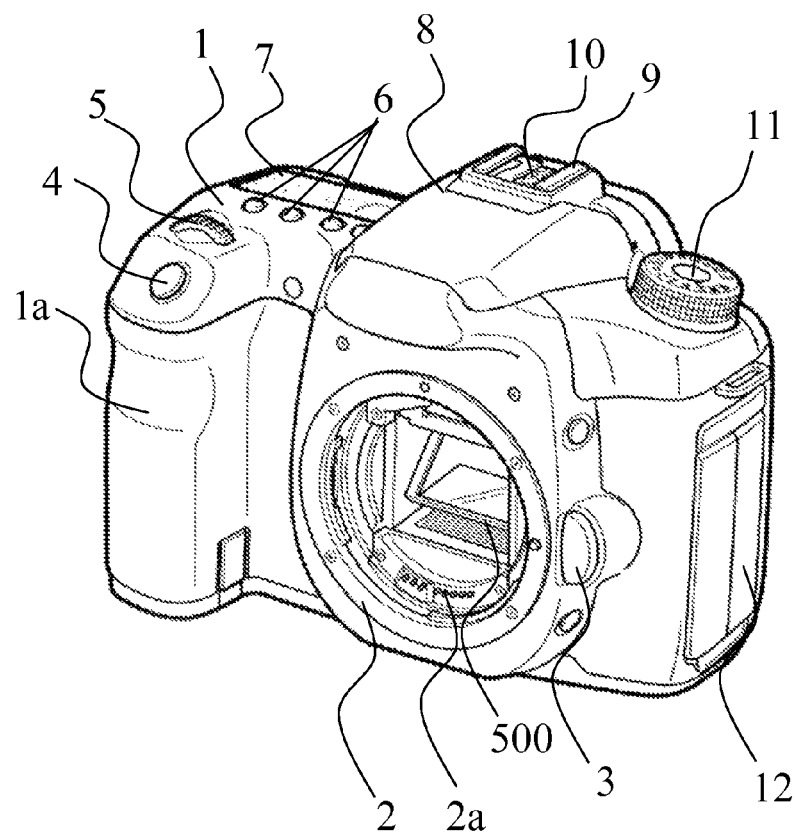
FIGS. 1A and 1B are appearance perspective views of a digital single-lens reflex camera according to an embodiment of the invention.

Exemplary embodiments of the invention will be described below with reference to the accompanied drawings. In each of the drawings, the same elements will be denoted by the same reference numerals and the duplicate descriptions thereof will be omitted.

Figure 1B:
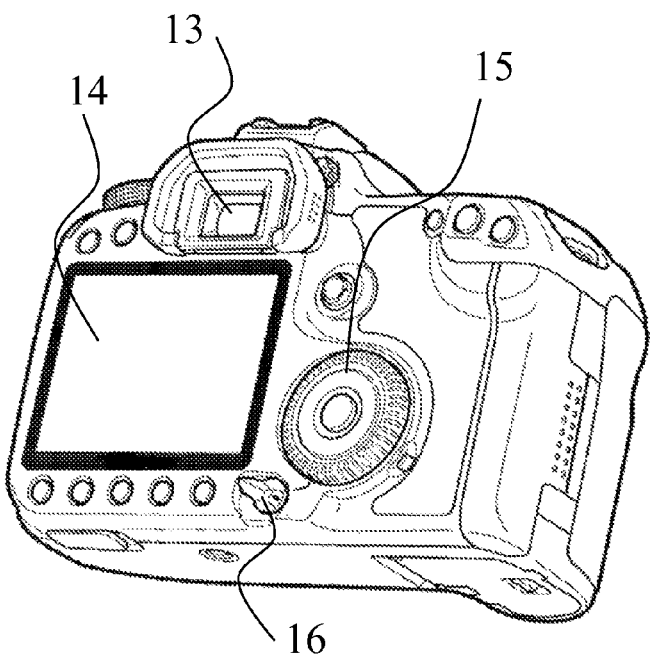

FIGS. 1A and 1B are appearance perspective views of a digital single-lens reflex camera according to an embodiment of the invention (image pickup apparatus, hereinafter referred to as "camera"). FIGS. 1A and 1B are diagrams seen from a front face side and a rear face side, respectively. A camera body 1 includes a grip 1a protruding forward so as to be easy for a user to stably grip when shooting. The camera body 1 and an image pickup lens unit (interchangeable lens unit), which is detachably attached to the camera body 1 and comprises an image pickup optical system, make up a camera system. A mount part 2 fixes an image pickup lens unit to the camera body 1. A mount contact 2a transmits a control signal, a state signal, and a data signal between the camera body 1 and the image pickup lens unit, and supplies power to the image pickup lens unit. The mount contact 2a may also transmit optical communication and voice communication as well as electric communication. Pushing a lens unlocking button 3 removes the image pickup lens unit from the camera body 1.

A shutter button 4, a main operation dial 5, an upper surface operation mode setting button 6, a LCD display panel 7 are arranged on a grip 1a side at a top of the camera body 1. The shutter button 4, which works as a start switch of shooting, allows a switch SW1 to be turned ON with one stroke and allows a switch SW2 to be turned ON with two strokes. The main operation dial 5 sets a shutter speed and a lens diaphragm value according to an operation mode when shooting.

The upper surface operation mode setting button 6 sets whether to take pictures serially or to take one frame with one push of the shutter button 4, and sets self-photographing mode. The LCD display panel 7 displays a part of an operation result of these operation members. An electronic flash 8, which pops up relative to the camera body 1, a shoe groove 9 for attaching a flash, a flash contact 10, and an image pickup mode setting dial 11 are also arranged at the top of the camera body 1.

An external terminal cover 12 capable of opening and closing is provided on a side surface opposite to a side surface on which the grip 1a of the camera body 1 is formed. A video signal output jack and an USB output connector as external interfaces are stored in the opened external terminal cover 12.

A finder eyepiece window 13 is provided above a rear surface of the camera body 1, and a color liquid crystal display 14 capable of displaying images is provided near a center of the rear surface of the camera body 1. A sub operating dial 15 arranged beside the color liquid crystal display 14 assists the main operating dial 5. For example, the sub operating dial 15 sets an exposure correction amount relative to a proper exposure value calculated by an automatic exposure apparatus in an AE mode of the camera. Or, the main operating dial 5 sets a shutter speed and the sub operating dial 15 sets a lens diaphragm value in a manual mode that allows a user to set a shutter speed and a lens diaphragm value. The sub operating dial 15 also selects a display of photographed images displayed on the color liquid crystal display 14. A main switch 16 starts or stops an operation of the camera.

FIGS. 2A and 2B are schematic block diagrams of the camera. A mirror box 500 includes a main mirror 501 and a sub mirror 503. FIG. 2A illustrates a mirror down state (first state) where the main mirror 501 and the sub mirror 503 are positioned inside the image pickup optical path from an image pickup lens 200 to an image pickup element 24. When the main mirror 501 and the sub mirror 503 are in the mirror down state, the main mirror 501 transmits and reflects an image pickup light. The image pickup light reflected by the main mirror 501 is guided to a pentaprism 18 of a finder optical system 35. The image pickup light transmitted through the main mirror 501 is reflected by the sub mirror 503 and is incident on a focus detection unit 17. FIG. 2B illustrates a mirror up state (second state) where the main mirror 501 and the sub mirror 503 are positioned outside the image pickup optical path. When the main mirror 501 and the sub mirror 503 are in the mirror up state, the image pickup light is incident on the image pickup element 24. The main mirror 501 and the sub mirror 503 are rotatable between the mirror down state and the mirror up state.

FIG. 3 is a schematic block diagram of the mirror box 500. The main mirror 501 is held by a main mirror holding member 502. The mirror box 500 pivotally supports an axis 502a provided on the main mirror holding member 502. The main mirror 501 and the main mirror holding member 502 make up the main mirror member of this embodiment.

The sub mirror 503 is held by a sub mirror holding member 504. An axis 502b of the main mirror holding member 502 pivotally supports a hole 504a formed on the sub mirror holding member 504. The sub mirror 503 and the sub mirror holding member 504 make up the sub mirror member of this embodiment. Rotation of the main mirror holding member 502 from the mirror down state to the mirror up state drives the sub mirror holding member 504 along a pin 506.

The mirror box 500 fixes a main mirror angle determining member 508 and a sub mirror angle determining member (abutting member) 507.

Figures 4A, 4B:
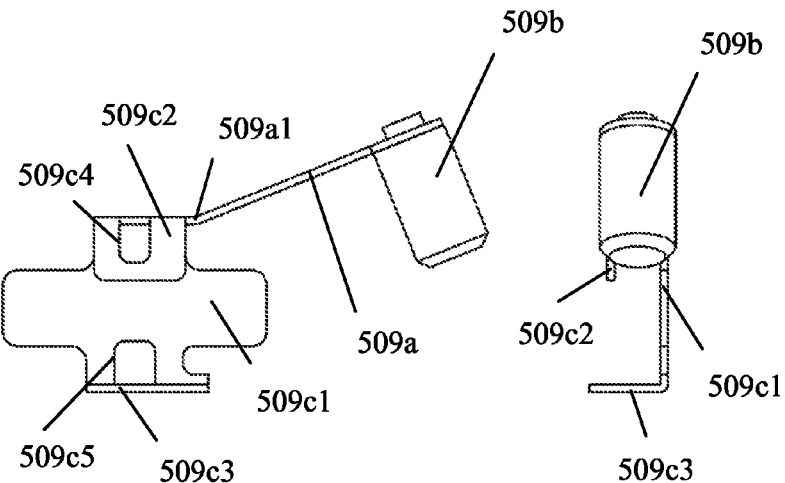
FIGS. 4A to 4D are schematic diagrams illustrating a bounce control member.

FIGS. 4A to 4D are schematic diagrams illustrating a bounce control member 509. FIG. 4A is a front view of the bounce control member 509. FIG. 4B is a side view of the bounce control member 509. As illustrated in FIGS. 4A to 4D, the bounce control member 509 includes a plate spring part (elastic deformation part) 509a, which is elastically deformable, a weight part 509b, and an attachment part 509c. The attachment part 509c of the bounce control member 509 is attached to an arm part 504b of the sub mirror holding member 504.

As illustrated in FIG. 4A, the plate spring part 509a extends from the attachment part 509c. The plate spring part 509a comprises a bending part 509a1. The weight part 509b is fixed to an end part of the plate spring part 509a. The attachment part 509c includes a first attachment surface 509c1, a second attachment surface 509c2, and a third attachment surface 509c3. The first and second attachment surfaces 509c1 and 509c2 face each other, and the third attachment surface 509c3 is perpendicular to the first and second attachment surfaces 509c1 and 509c2. The second attachment surface 509c2 has a first hole part 509c4. A second hole part 509c5 is formed to stride over the first and third attachment surfaces 509c1 and 509c3.

Figure 4C:
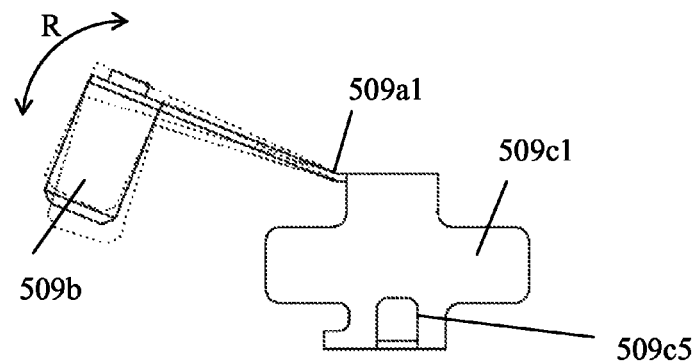

Attaching the bounce control member 509 to the sub mirror holding member 504 allows the bounce control member 509 to perform two kinds of motions, and thus a bounce of the sub mirror holding member 504 decreases. One of the two kinds of motions of the bounce control member 509 is swinging motion as illustrated in FIG. 4C. Since the weight part 509b is fixed to the end part of the plate spring part 509a, the plate spring part 509a swings in an arrow "R" direction around the bending part 509a1 as illustrated in FIG. 4C.

Figure 4D:
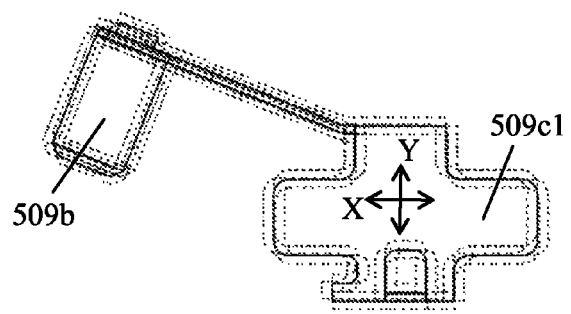

The other of the two kinds of motions of the bounce control member 509 is slide motion as illustrated in FIG. 4D. As described later, the bounce control member 509 is attached to the arm part 504b of the sub mirror holding member 504 so as to slightly slide relative to the arm part 504b. This allows the bounce control member 509 to slightly slide in an arrow "X" direction and an arrow "Y" direction of FIG. 4D relative to the arm part 504b.

Figure 5A:
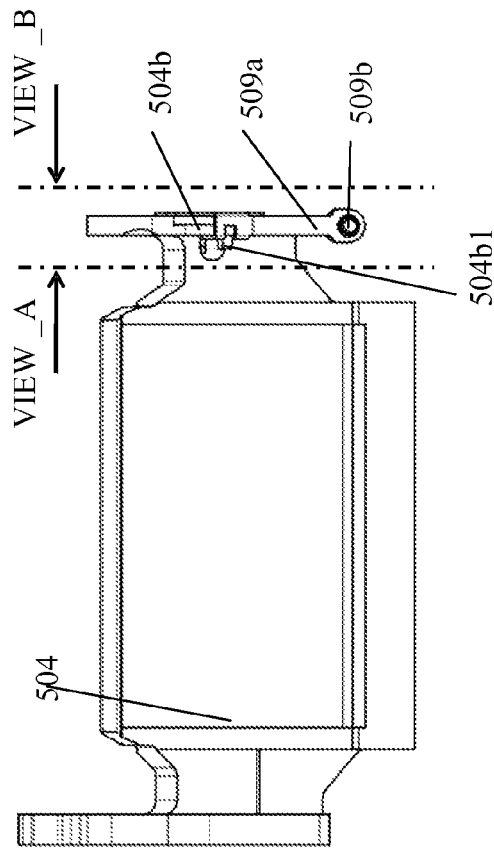
FIGS. 5A to 5D are schematic diagrams illustrating a bounce control member attached to a sub mirror holding member.
Figure 5D:
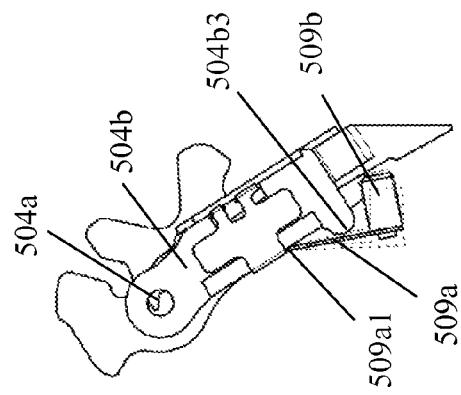
Figure 5C:
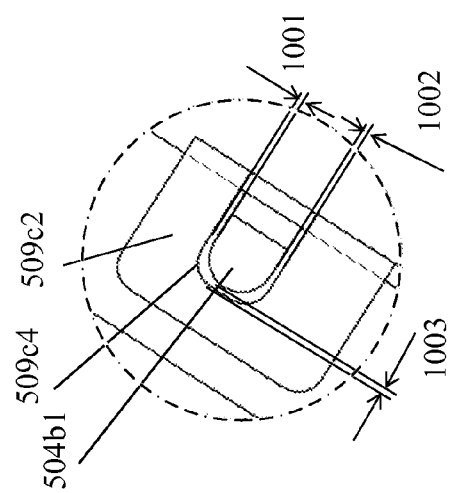
Figure 5B:
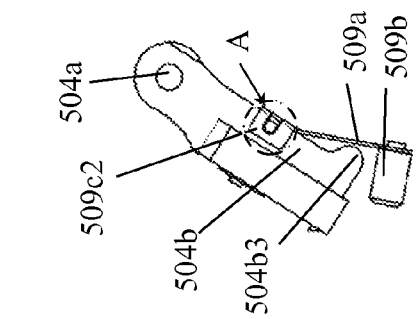

FIGS. 5A to 5D are schematic diagrams illustrating the bounce control member 509 attached to the sub mirror holding member 504. FIG. 5A is a front view of the sub mirror holding member 504 holding the bounce control member 509 with the arm part 504b. FIG. 5B is a schematic diagram of the arm part 504b of the sub mirror holding member 504 holding the bounce control member 509 seen from VIEW_A of FIG. 5A. FIG. 5C is an enlarged view of "A" part illustrated by a dashed line circle of FIG. 5B. FIG. 5D is a schematic diagram of the arm part 504b of the sub mirror holding member 504 holding the bounce control member 509 seen from VIEW_B of FIG. 5A.

As illustrated in FIGS. 5A-5D, the bounce control member 509 is attached to the arm part 504b of the sub mirror holding member 504 so as to sandwich the arm part 504b between the first and second attachment surfaces 509c1 and 509c2. The arm part 504b is also sandwiched between a base end of the plate spring part 509a and the third attachment surface 509c3.

Figure 6A:
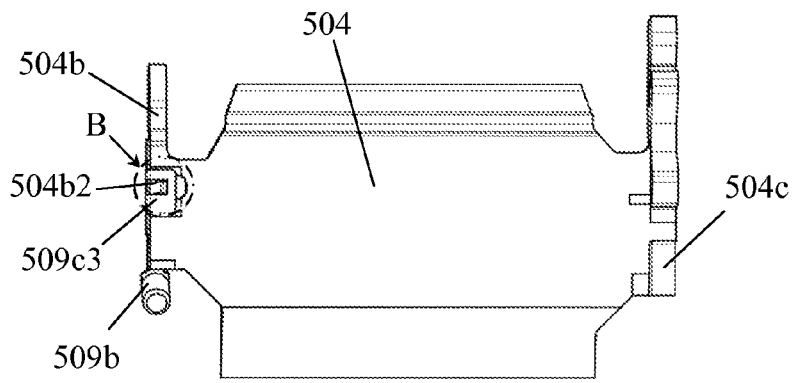
FIGS. 6A to 6C are schematic diagrams illustrating a bounce control member attached to a sub mirror holding member.
Figure 6B:
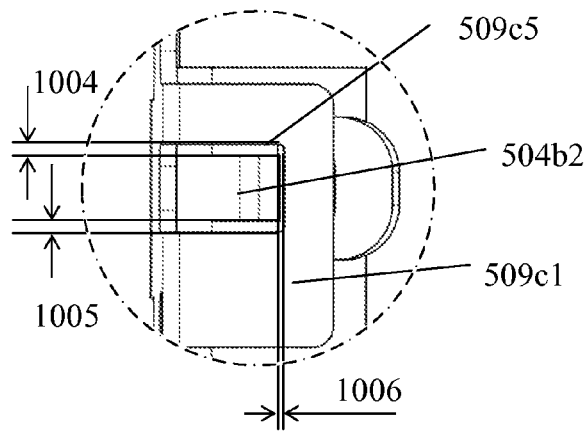
Figure 6C:
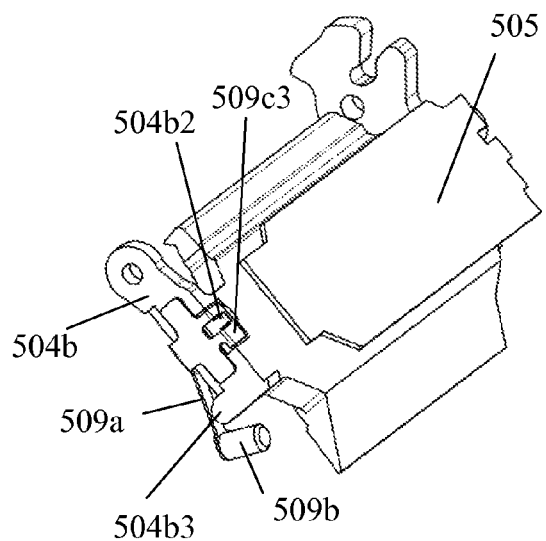

FIGS. 6A to 6C are schematic diagrams illustrating the bounce control member 509 attached to the sub mirror holding member 504. FIG. 6A is a back view of the sub mirror holding member 504 holding the bounce control member 509 with the arm part 504b. FIG. 6B is an enlarged view of "B" part illustrated by a dashed line circle of FIG. 6A. FIG. 6C is a schematic diagram of a state where a damping member (fixing member) 505 is attached to a back surface of the sub mirror holding member 504.

As illustrated in FIG. 6A, an abutting part 504c is formed on the back surface of the sub mirror holding member 504. The abutting part 504c abuts against the sub mirror angle determining member 507 when the sub mirror holding member 504 is in the mirror down state.

In this embodiment, the abutting part 504c abutting against the sub mirror angle determination member 507 is formed on a side of the sub mirror holding member 504 on which the bounce control member 509 is not attached. Because bounce time of a side on which the abutting part 504c is not formed is longer than that of a side on which the abutting part 504c is formed when the sub mirror holding member 504 becomes the mirror down state.

As illustrated in FIGS. 6A-6C, the third attachment surface 509c3 engages with the back surface of the sub mirror holding member 504. A second protruding part 504b2 of the sub mirror holding member 504 is then exposed inside the second hole part 509c5 of the bounce control member 509. As illustrated in FIG. 6B, slight gaps 1004 to 1006 are formed between the second hole part 509c5 and the second protruding part 504b2.

As illustrated in FIG. 6C, the damping member 505 having adhesiveness is adhered to the back surface of the sub mirror holding member 504 after attaching the bounce control member 509 to the arm part 504b of the sub mirror holding member 504. The damping member 505 is attached to a surface (rear surface) opposite to an incident surface of an image pickup light of the sub mirror holding member 504. The damping member 505 prevents reflection from the rear surface of the sub mirror holding member 504.

As previously mentioned, the bounce control member 509 is attached to the sub mirror holding member 504 so as to have the gaps 1001 to 1006 relative to the sub mirror holding member 504. In other words, the bounce control member 509 is attached to the sub mirror holding member 504 so as to have a predetermined interval relative to the sub mirror holding member 504. This allows the bounce control member 509 to slide by the gaps 1001 to 1006 relative to the sub mirror holding member 504.

The damping member 505 is adhered to the back surface of the sub mirror holding member 504, but does not block the slide motion of the bounce control member 509.

FIGS. 7A to 7C are schematic diagrams illustrating the main mirror 501 and the sub mirror 503 held by the mirror box 500. FIG. 7B is a front view of the main mirror 501 and the sub mirror 503, FIG. 7A is a schematic diagram seen from VIEW_C of FIG. 7B, and FIG. 7C is a schematic diagram seen from VIEW_D of FIG. 7B.

As illustrated in FIG. 7C, a main mirror angle determining part 502d of the main mirror holding member 502 abuts against the main mirror angle determining member 508 so that the main mirror holding member 502 stops in the mirror down state.

As illustrated in FIG. 7A, the abutting part 504c of the sub mirror holding member 504 abuts against the sub mirror angle determining member 507 so that the sub mirror holding member 504 stops in the mirror down state. As illustrated in FIGS. 7A and 7B, the main mirror angle determining member 508 is arranged on a side opposite to a side on which the sub mirror angle determining member 507 is arranged. As illustrated in FIG. 7C, the side on which the main mirror angle determining member 508 is arranged is the same as a side on which the bounce control member 509 is attached to the sub mirror holding member 504.

Figure 8A:
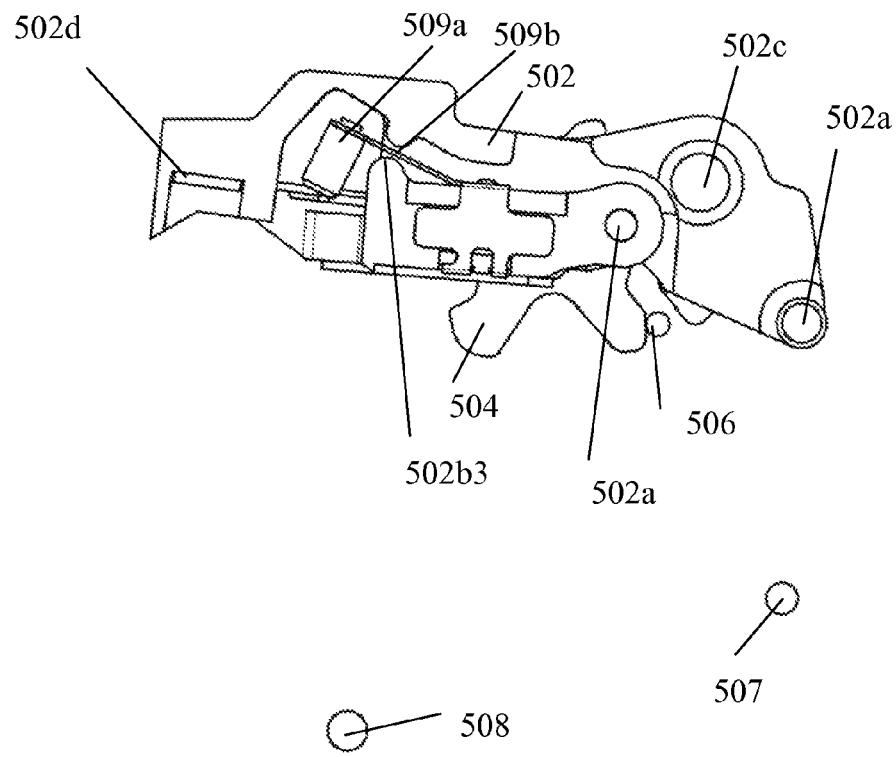
FIGS. 8A to 8D are schematic diagrams illustrating a state that a main mirror and a sub mirror perform a mirror down operation.
Figure 8B:
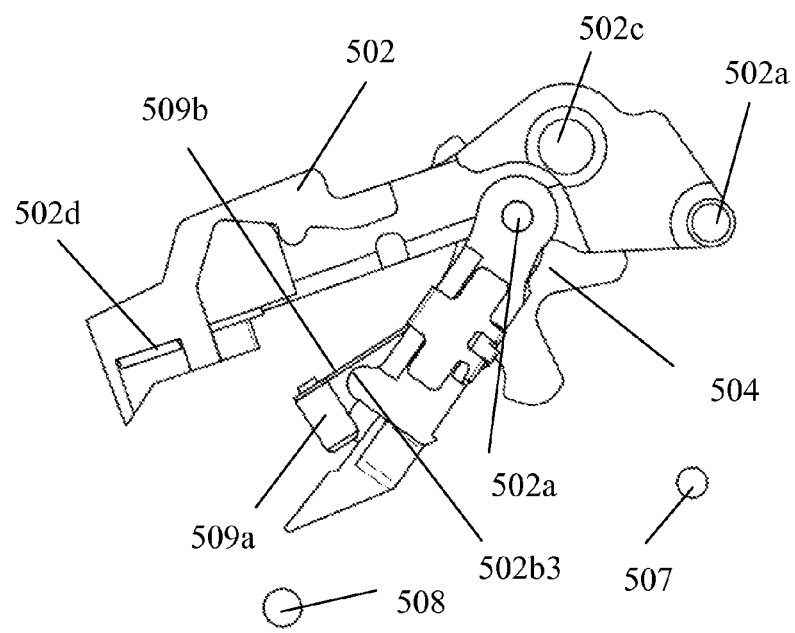
Figure 8C:
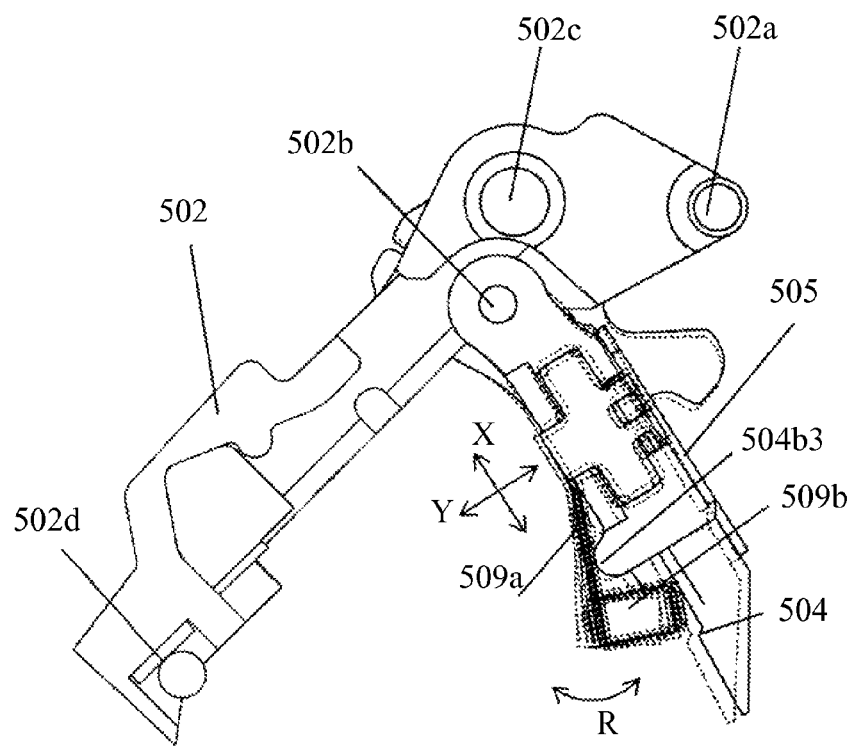
Figure 8D:
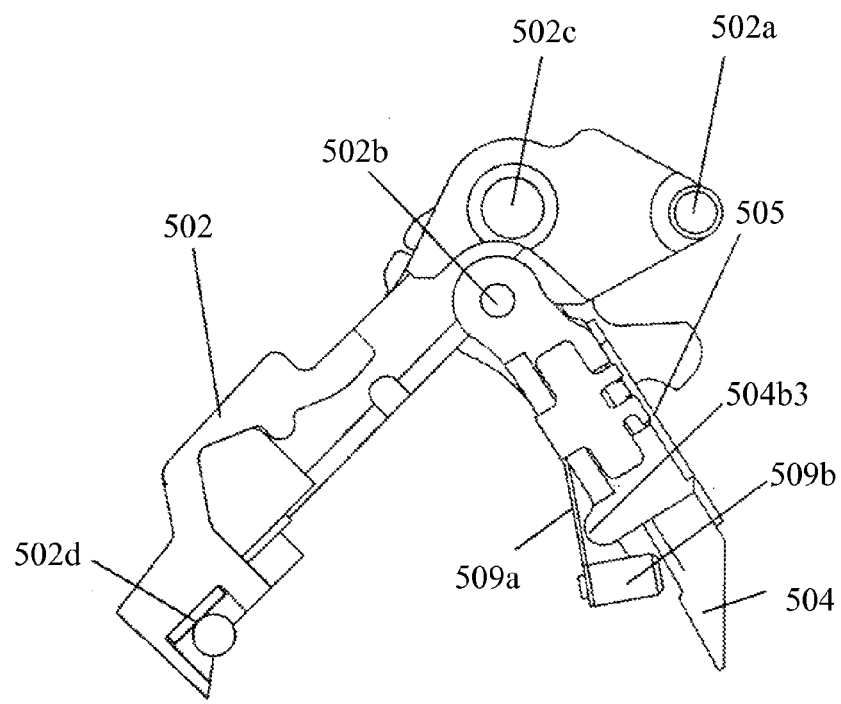

FIGS. 8A to 8D are schematic diagrams illustrating a state that the main mirror 501 and the sub mirror 503 perform a mirror down operation. FIG. 8A illustrates the mirror up state of the main mirror 501 and the sub mirror 503. FIG. 8B illustrates start of the mirror down operation of the main mirror 501 and the sub mirror 503. FIG. 8C illustrates a state that the main mirror 501 and the sub mirror 503 are the mirror down state, the sub mirror holding member 504 bounces, and the bounce control member 509 performs the swinging motion and the slide motion. FIG. 8D illustrates a state that bounce of the sub mirror holding member 504 is convergent after finishing the swinging motion and the slide motion of the bounce control member 509.

As illustrated in FIG. 8C, when the abutting part 504c of the sub mirror holding member 504 collides with the sub mirror angle determining member 507, the sub mirror holding member 504 repeats reciprocation around the axis 502b, which is a rotating center of the sub mirror holding member 504. In other words, a mirror bounce phenomenon occurs.

The plate spring part 509a of the bounce control member 509 then swings in a "R" direction and the entire bounce control member 509 slightly slides in an arrow "X" direction and an arrow "Y" direction relative to the arm part 504b. The regulating protruding part 504b3 then regulates amplitudes of the swinging motion of the plate spring part 509a.

The swinging motion and the slide motion of the bounce control member 509 consume motion energy generated by the mirror bounce phenomenon. This allows the sub mirror 503 to quickly stop at the mirror down position.

Further, fixing the damping member 505 to the sub mirror holding member 504 so as to sandwich the bounce control member 509 in this embodiment allows the damping member 505 to damp motion energy of the bounce control member 509. As a result, the mirror bounce phenomenon is capable of being damped more quickly. The damping member 505 also prevents reflection from the rear surface of the sub mirror holding member 504 and the rear surface of the bounce control member 509.

If a vibration phase of the swinging motion of the plate spring part 509a is opposite to a vibration phase of the mirror bounce phenomenon and their vibration periods are the same, motion energy is effectively consumed and thus the mirror bounce phenomenon is more quickly convergent. Spring constant of the plate spring part 509a and a mass of the weight part 509b are set so that the vibration phase of the plate spring part 509a is opposite to the vibration phase of the mirror bounce phenomenon and their vibration periods are the same.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-147532, filed on Jul. 18, 2014, which is hereby incorporated by reference herein in its entirety.

What is claimed is:

1. An image pickup apparatus comprising:
   a mirror member rotatable between a first state arranged inside an image pickup optical path and a second state arranged outside the image pickup optical path;
   an abutting member that abuts against the mirror member in a case where the mirror member is in the first state; and
   a bounce control member attached to the mirror member and configured to control a vibration of the mirror member in a case where the mirror member collides with the abutting member,
   wherein an attachment part attached to the mirror member is formed at a first end of the bounce control member,
   wherein a weight part is formed at a second end of the bounce control member, wherein an elastic deformation part, which is elastically deformable, is formed between the attachment part and the weight part, and wherein the attachment part and the weight part are connected through the elastic deformation part.

2. The image pickup apparatus according to claim 1, wherein the attachment part is attached to the mirror member so that the bounce control member is slidable relative to the mirror member.

3. The image pickup apparatus according to claim 2, wherein a protruding part is formed on the mirror member, wherein a hole part is formed on the attachment part, and wherein the protruding part engages inside the hole part and gaps are provided between the hole part and the protruding part in a case where the attachment part is attached to the mirror member.

4. The image pickup apparatus according to claim 1, further comprising a fixing member fixed to the mirror member, wherein the fixing member is fixed to the mirror member after the bounce control member is attached to the mirror member.

5. The image pickup apparatus according to claim 4, wherein the fixing member is fixed to a surface of the mirror member opposite to an incident surface of the mirror member.

6. The image pickup apparatus according to claim 4, wherein the fixing member prevents reflection of light at the surface of the mirror member opposite to the incident surface of the mirror member.

7. The image pickup apparatus according to claim 1, wherein the bounce control member is attached to a side of the mirror member opposite to a side thereof on which the mirror member abuts against the abutting member across the optical path.

8. The image pickup apparatus according to claim 1, wherein a mass of the weight part and spring constant of the elastic deformation part are set so that a vibration phase of a bounce of the mirror member is opposite to a vibration phase of a bounce of the bounce control member and their vibration periods are the same in a case where the mirror member collides with abutting member.

9. The image pickup apparatus according to claim 1, wherein the mirror member includes (1) a main mirror member that transmits and reflects an image pickup light in a case where the mirror member is the first state and (2) a sub mirror member that reflects a transmitted light from the main mirror member, and wherein the bounce control member is attached to the sub mirror member.

10. A camera system including a camera body and an image pickup lens unit detachably attached to the camera body, the camera system comprising:

a mirror member rotatable between a first state arranged inside an image pickup optical path and a second state arranged outside the image pickup optical path;

an abutting member that abuts against the mirror member in a case where the mirror member is in the first state; and a bounce control member attached to the mirror member and configured to control a vibration of the mirror member in a case where the mirror member collides with the abutting member, wherein an attachment part attached to the mirror member is formed at a first end of the bounce control member, wherein a weight part is formed at a second end of the bounce control member, wherein an elastic deformation part, which is elastically deformable, is formed between the attachment part and the weight part, and wherein the attachment part and the weight part are connected through the elastic deformation part.

11. The camera system according to claim 10, wherein the attachment part is attached to the mirror member so that the bounce control member is slidable relative to the mirror member.

12. The camera system according to claim 11, wherein a protruding part is formed on the mirror member, wherein a hole part is formed on the attachment part, and wherein the protruding part engages inside the hole part and gaps are provided between the hole part and the protruding part in a case where the attachment part is attached to the mirror member.

13. The camera system according to claim 10, further comprising a fixing member fixed to the mirror member, wherein the fixing member is fixed to the mirror member after the bounce control member is attached to the mirror member.

14. The camera system according to claim 13, wherein the fixing member is fixed to a surface of the mirror member opposite to an incident surface of the mirror member.

15. The camera system according to claim 13, wherein the fixing member prevents reflection of light at the surface of the mirror member opposite to the incident surface of the mirror member.

16. The camera system according to claim 10, wherein the bounce control member is attached to a side of the mirror member opposite to a side thereof on which the mirror member abuts against the abutting member across the optical path.

17. The camera system according to claim 10, wherein a mass of the weight part and spring constant of the elastic deformation part are set so that a vibration phase of a bounce of the mirror member is opposite to a vibration phase of a bounce of the bounce control member and their vibration periods are the same in a case where the mirror member collides with abutting member.

18. The camera system according to claim 10, wherein the mirror member includes (1) a main mirror member that transmits and reflects an image pickup light in a case where the mirror member is the first state and (2) a sub mirror member that reflects a transmitted light from the main mirror member, and wherein the bounce control member is attached to the sub mirror member.

* * * * *